Jan. 12, 1937.  H. KOPLIN ET AL  2,067,400
TRANSMISSION BELT
Filed Dec. 11, 1933  2 Sheets-Sheet 1

WITNESSES
Irving J. Rose
L. E. Kilian

INVENTOR
Harry Koplin &
Thomas S. Watson,
By R. S. Caldwell
ATTORNEY

Jan. 12, 1937.  H. KOPLIN ET AL  2,067,400
TRANSMISSION BELT
Filed Dec. 11, 1933   2 Sheets-Sheet 2

Patented Jan. 12, 1937

2,067,400

UNITED STATES PATENT OFFICE 2,067,400

TRANSMISSION BELT

Harry Koplin, New York, N. Y., and Thomas S. Watson, Milwaukee, Wis.

Application December 11, 1933, Serial No. 701,852

4 Claims. (Cl. 74—233)

The invention relates to belts for transmitting power.

It has heretofore been proposed to employ a plurality of separate belts, such as V-belts, for transmitting power between multiple-grooved pulleys or sheaves.

An object of the present invention is to provide an improved transmission belt wherein a plurality of traction elements for engaging a multiple-grooved pulley are connected to form a unit by a flexible band, which holds the traction elements in assembled relation and transmits driving tension, the band being readily spliced and being well adapted to co-operate with an idler or other pulley engaging its outer side.

Another object of the invention is to provide a transmission belt in which a soft rubber band or ribbon is interposed in bonded relation between the traction elements and tension-transmitting band to permit easy flexing and to facilitate the passage of the belt over pulleys of small diameter.

Another object of the invention is to provide a method of constructing a transmission belt of the character set forth.

The invention further consists in the several features hereinafter described and claimed.

In the accompanying drawings.

Figure 1:
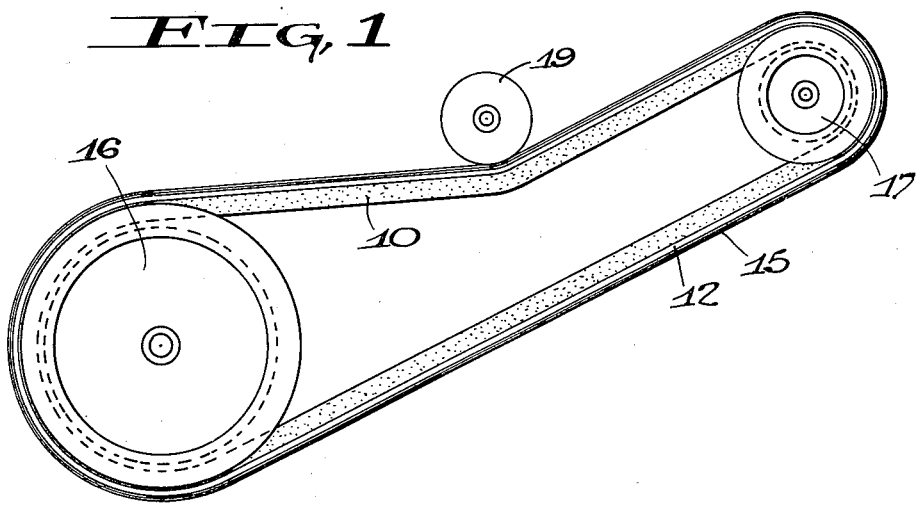
Fig. 1 is a side view of a belt transmission employing a belt constructed in accordance with the invention.
Figure 2:
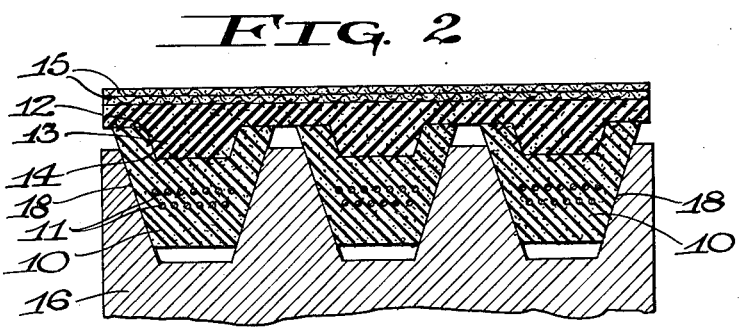
Fig. 2 is a cross-section of the belt.
Figure 3:
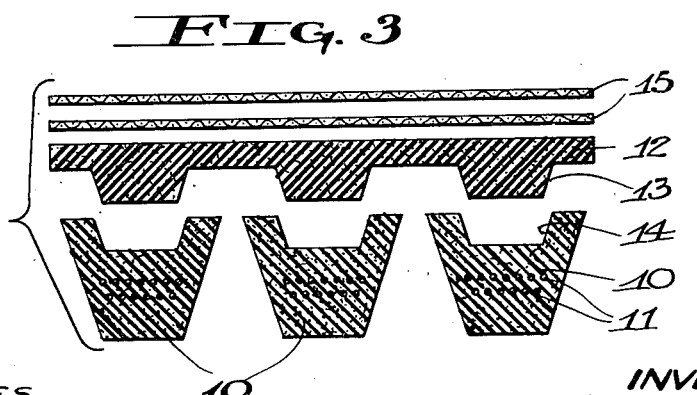
Fig. 3 is a cross-section of the belt parts before they are bonded together.

In that form of the invention shown in Figs. 1 to 3, 10 designates each of a plurality of belt or traction elements, preferably of trapezoidal cross-section, like a V-belt, and constructed of a tough wear-resisting rubber compound. Each traction element is here shown to have embedded therein longitudinally extending fabric plies 11. At their outer wide edges, two or more of the laterally spaced traction elements are vulcanized to one face of a flat soft rubber band 12, which is here shown to laterally connect the traction elements. Preferably the traction elements 10 and soft rubber band 12 have inter-engaging bonded parts, the band being provided with ribs or projections 13 which enter channels or pockets 14 formed in the traction elements. The outer face of the band is vulcanized to one or more plies or bands 15 of a tough wear-resisting cord belt fabric, such as canvas. In constructing the belt, it may be vulcanized in sections in suitable molds. The belt may be vulcanized to an endless form, or it may be left with ends to be spliced.

The traction elements 10, which may be regarded as welts on the band 12, are adapted to engage pulleys or sheaves 16 and 17 for the transmission of power between the pulleys, the pulleys each having a plurality of V-grooves 18 to receive the traction elements 10, which wedgingly engage the opposite side walls of the grooves. A pulley 19 of any suitable type may engage the outer ply of cord fabric 15, to serve as an idler, although in some instances it may transmit power.

The elastic soft rubber band 12 permits proper flexing of the traction elements 10, so that they may pass around small diameter pulleys without excessive wear. The substantially inextensible flat fabric plies 15 at the outer side of the band transmit driving tension and may be readily spliced in any suitable manner, it being unnecessary to splice the traction elements. One or both of the bands 12 and 15 hold the traction elements in laterally connected relation.

Figure 4:
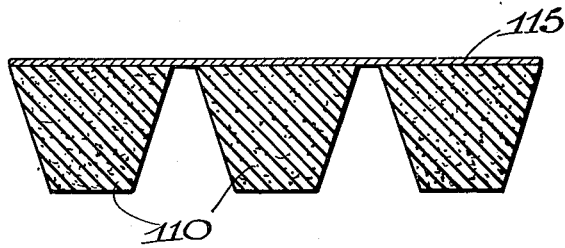
Fig. 4 is a cross-section of a modified form of belt.

In the modified form of transmission belt shown in Fig. 4, a plurality of laterally spaced traction elements 110 of a suitable rubber compound, and preferably of trapezoidal or V-shaped cross-section, are vulcanized to one face of a flat flexible metal band 115, preferably of resilient steel. The metal band holds the traction elements in assembled relation and transmits the driving tension, while the traction elements engage the multiple-grooved pulleys in the manner of the belt shown in Fig. 2.

Figure 5:
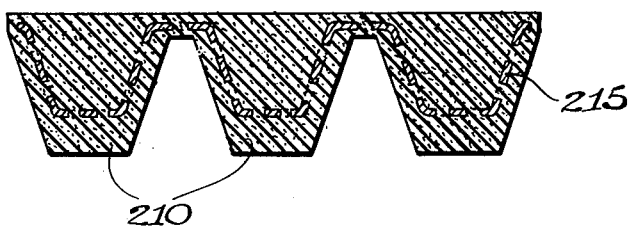
Fig. 5 is a cross-section of another modified form of belt.

In the modified form of transmission belt shown in Fig. 5, a plurality of traction elements 210 of a suitable rubber compound have embedded therein a perforated, flexible metal band which holds the traction elements in assembled relation and transmits the driving tension, the traction elements and band being vulcanized together, and the rubber compound passing through the perforations of the band. The band may be of any suitable shape and is here shown to have projections or corrugations.

What we claim as new and desire to secure by Letters Patent is:

1. A transmission belt comprising a plurality of traction elements adapted to engage a multiple-grooved pulley, an elastic soft rubber band having one face bonded to the outer edges of said elements, and a substantially inextensible flexible band bonded to the other face of said soft rubber band, said soft rubber band laterally connecting said traction elements.

2. A transmission belt comprising a plurality of traction elements adapted to engage a multiple-grooved pulley, an elastic soft rubber band secured to said traction elements, and a substantially inextensible flexible tension-transmitting band secured to said soft rubber band, the soft rubber of said elastic band being interposed between said traction elements and flexible band.

3. A transmission belt comprising a plurality of traction elements adapted to engage a multiple-grooved pulley, a substantially inextensible, flexible, tension-transmitting band for said traction elements, and an elastic soft rubber body interposed between said band and each traction element and bonded to said band and traction element.

4. A transmission belt comprising a plurality of traction elements adapted to engage a multiple-grooved pulley, a substantially inextensible flexible band for said traction elements, and an elastic soft rubber body interposed between said band and each traction element and bonded to said band and traction element, said soft rubber body and traction elements having inter-engaging projections and recesses.

HARRY KOPLIN.
THOMAS S. WATSON.